United States Patent [19]
Bellinger

[11] Patent Number: 5,738,606
[45] Date of Patent: Apr. 14, 1998

[54] CONTROL SYSTEM FOR REGULATING OUTPUT TORQUE OF AN INTERNAL COMBUSTION ENGINE

[75] Inventor: Steven M. Bellinger, Columbus, Ind.

[73] Assignee: Cummins Engine Company, Inc., Columbus, Ind.

[21] Appl. No.: 723,526

[22] Filed: Sep. 30, 1996

[51] Int. Cl.$^6$ ................................. B60K 41/04
[52] U.S. Cl. ................................. 477/111
[58] Field of Search ..................... 477/107, 111

[56] References Cited

U.S. PATENT DOCUMENTS

| | | |
|---|---|---|
| 4,606,005 | 8/1986 | Ribbens. |
| 4,803,898 | 2/1989 | Hibino et al.. |
| 4,809,660 | 3/1989 | Marsh et al.. |
| 4,823,645 | 4/1989 | Gaus et al.. |
| 4,889,014 | 12/1989 | Iwata. |
| 4,914,597 | 4/1990 | Moncelle et al.. |
| 5,048,372 | 9/1991 | Sodeno et al.. |
| 5,065,319 | 11/1991 | Iwatsuki et al.. |
| 5,150,635 | 9/1992 | Minowa et al.. |
| 5,184,527 | 2/1993 | Nakamura. |
| 5,186,081 | 2/1993 | Richardson et al.. |
| 5,343,780 | 9/1994 | McDaniel et al.. |
| 5,343,781 | 9/1994 | Minowa et al.. |
| 5,385,516 | 1/1995 | Grange et al.. |
| 5,445,128 | 8/1995 | Letang et al.. |
| 5,457,633 | 10/1995 | Palmer et al.. |
| 5,477,827 | 12/1995 | Weisman, II et al.. |
| 5,496,227 | 3/1996 | Minowa et al.. |

OTHER PUBLICATIONS

Detroit Diesel, DDEC II Application and Installation Manual, "Alternate Torque Option", Section 4, E-1, (no date).

Primary Examiner—Dirk Wright
Attorney, Agent, or Firm—Woodard, Emhardt, Naughton Moriarty & McNett

[57] ABSTRACT

An engine control system is operable to provide an engine fueling rate equal to the larger of a first engine fueling rate at which the resulting engine torque is limited by a maximum input torque capacity of a presently engaged gear ratio of the transmission and a second engine fueling rate at which the resulting engine torque is limited by a nominal input torque capacity of the transmission. The foregoing technique can be enabled at all times, or alternatively only after determination that the vehicle is experiencing deceleration under heavy engine load conditions. The engine control system may be further operable to determine a third engine fueling rate at which the resulting engine output torque is limited by a maximum operating torque capacity of the transmission propeller shaft, as well as a fourth engine fueling rate at which the resulting engine output torque is limited by a maximum operating torque capacity of the drive axle connected thereto. The actual engine fueling rate is then chosen to be the minimum of the larger of the first and second engine fueling rates, the third engine fueling rate, and the fourth engine fueling rate. This technique can be enabled either at all times, or alternatively only when the presently engaged gear ratio is one of a set of lower gear ratios of the transmission.

24 Claims, 4 Drawing Sheets

CONTROL SYSTEM FOR REGULATING OUTPUT TORQUE OF AN INTERNAL COMBUSTION ENGINE

FIELD OF THE INVENTION

The present invention relates generally to electronic control systems for internal combustion engines, and more specifically to such systems for controlling engine output torque.

BACKGROUND OF THE INVENTION

In motor vehicles equipped with electronically controlled throttle systems, driving power (engine output torque) is typically controlled in accordance with an engine torque control algorithm which regulates engine output torque based, in part, on commanded throttle position (or percentage). When employing such an engine torque control algorithm, care must be taken to avoid operating conditions in which torque limitations in the vehicle drivetrain may be exceeded. For this reason, motor vehicle transmissions typically have a nominal input torque capacity associated therewith.

As used herein, the term "nominal input torque capacity" of a given transmission is defined as the maximum input torque level at which all of the selectable transmission gear ratios can safely operate. While one or more of the selectable gear ratios may be capable of safely operating at higher input torque levels, the nominal input torque capacity corresponds to the one or more gear ratios having the lowest-valued maximum input torque capacity. Setting the nominal input torque capacity of the transmission at this lowest-valued maximum input torque capacity thus insures safe operating conditions for each of the selectable gear ratios. The remaining drivetrain components must also be specified to have input torque capacities which meet or exceed the nominal input torque capacity of the transmission.

A typical engine torque control algorithm is operable to produce an actual engine fueling rate (EFR), which is a function of various vehicle and engine operating conditions including, for example, engine speed, engine load, desired throttle percentage and cruise control status, wherein EFR is limited, under certain operating conditions, by the nominal input torque capacity of the transmission. A fueling system associated with the engine is then responsive to EFR to fuel the engine in accordance therewith.

While all vehicular transmissions are designed with some nominal input torque capacity, the absolute capacity of individual gear ratios of the transmission may vary, with one or more ratios often having a considerable margin of safety. As a specific example, because torque is not being transmitted through active gear meshes, the actual torque capacity of direct drive ratios (i.e. 1:1) commonly exceed the nominal input torque capacity of a given transmission by significant margins. This concept has been recognized by Richardson et al. in U.S. Pat. No. 5,186,081.

Richardson et al. discloses an engine control system which limits supercharger boost pressure based on a comparison between engine output torque and an input torque limit of the selected transmission gear, wherein separate transmission input torque limits are predetermined for each transmission gear and stored in memory. Richardson et al. thus provides for greater engine output torque in certain transmission gears than is possible using engine control techniques based on a single transmission input torque capacity rating.

The Richardson et al. system, however, suffers from a fundamental drawback in that while vehicle performance may be enhanced in certain gear ratios by increasing engine output torque, such a torque increase may well exceed the input torque rating of one or more of the remaining drivetrain components. Thus, while the transmission may be able to withstand increased engine output torque for certain gear ratios, drivetrain components downstream of the transmission may be damaged or destroyed if the input torque ratings thereof are not properly taken into account in the engine torque control algorithm. This concern is heightened in heavy duty tractor truck applications having additional drivetrain components such as one or more auxiliary transmissions, power take-off systems, interconnecting propeller shafts and other interconnecting drivetrain components.

Many electronic automotive control systems determine the currently selected transmission gear by comparing a ratio of engine speed to vehicle speed. Thus, another drawback of the Richardson et al. system occurs when the vehicle is stationary (vehicle speed=0), which produces an invalid gear ratio calculation. The Richardson et al. system does not provide for regulation of engine output torque during an invalid gear ratio condition such as upon vehicle takeoff, which is typically a situation where management of engine output torque would be desirable to protect drivetrain components from excessive levels of torque in the lower gears (higher numeric gear ratios) of the transmission.

What is therefore needed is a control system for regulating engine output torque as a function of input torque capacity of each of the drivetrain components, including the presently selected gear ratio of the transmission. Such a system should take into account vehicle takeoff conditions and provide for corresponding regulation of engine output torque capability. Ideally, such a system should be optionally configured for regulation of engine output torque capability at any time, as needed, or alternatively only under conditions of vehicle deceleration under heavy engine load operation.

SUMMARY OF THE INVENTION

The foregoing shortcomings of the prior art are addressed by the present invention. In accordance with one aspect of the present invention, an engine and drivetrain control system is provided for regulating the output torque of an internal combustion engine. The engine produces the output torque in accordance with a fueling rate provided to a fueling system thereof, and the drivetrain includes at least one transmission coupled to the engine wherein the transmission has a plurality of engageable gear ratios, a drive axle and a propeller shaft coupling the transmission to the drive axle. A control computer is operable to execute software algorithms for regulating fuel rate delivery to the fuel system according to, among other vehicle operation parameters, drivetrain input torque limit considerations. According to one preferred technique for regulating engine output torque, a first engine fueling rate is determined which is an engine fueling rate at which the resulting engine output torque is limited by a maximum input torque capacity of a presently engaged gear ratio of the transmission. A second engine fueling rate is determined which is an engine fueling rate at which the resulting engine output torque is limited by a nominal input torque capacity of the transmission. The engine is then fueled in accordance with the larger of the first and second engine fueling rates.

In accordance with another aspect of the present invention, vehicle acceleration and engine operating power are determined. The engine is fueled according to the first engine fueling rate only if vehicle acceleration is less than a predefined acceleration limit and engine operating power exceeds a predefined threshold, and otherwise the engine is fueled according to the second engine fueling rate.

In accordance with still another aspect of the present invention, a third engine fueling rate is determined which is a fueling rate at which the resulting engine output torque is limited by a maximum operating torque capacity of the propeller shaft, and a fourth engine fueling rate is determined which is an engine fueling rate at which the resulting engine output torque is limited by a maximum operating torque capacity of the drive axle. The engine is then fueled according to a minimum of the larger of the first and second engine fueling rates, the third engine fueling rate, and the fourth engine fueling rate.

In accordance with yet another aspect of the present invention, the engine is fueled according to a comparison between the four engine fueling rates described above only if the present gear ratio of the transmission is one of a set of lower gear ratios thereof, and otherwise the engine is fueled according to the larger of the first and second engine fueling rates.

In accordance with still a further aspect of the present invention, determination of the first engine fueling rate is made by sensing a present gear ratio of the transmission. If the gear ratio is a valid gear ratio, the engine fueling rate at which the resulting engine torque is limited by the maximum input torque capacity of the gear ratio is computed and set equal to the first engine fueling rate. If the gear ratio is an invalid gear ratio and the vehicle is stationary, the gear ratio is set to the gear ratio of the lowest gear of the transmission prior to computing the first engine fueling rate. If the gear ratio is an invalid gear ratio and the vehicle is moving, then the second engine fueling rate is retrieved from memory and set equal to the first engine fueling rate. Alternatively, the first engine fueling rate may be broadcast by a computer associated with the transmission onto a communications datalink connected to the control computer.

One object of the present invention is to provide a control system for regulating engine output torque as a function of the input torque capacity of the presently engaged gear ratios of the transmissions as well as the various remaining components of the vehicle drivetrain.

Another object of the present invention is to provide such regulation at all times, or alternatively only when vehicle acceleration is less than a predefined value and engine load exceeds a predefined threshold.

Yet another object of the present invention is to provide such regulation only in the lower gear ratios of the transmission, and otherwise controlling engine output torque only as a function of the maximum input torque capacity of the presently engaged gear ratio of the transmission.

Still another object of the present invention is to provide a series of different engine fueling rates in memory, which fueling rates are selectable in accordance with the drivetrain input torque capacity considerations, or alternatively providing a mechanism by which the transmission provides the various engine fueling rates and/or gear ratio data to the engine control computer.

These and other objects of the present invention will become more apparent from the following description of the preferred embodiment.

DESCRIPTION OF THE PREFERRED EMBODIMENTS

Figure 1:
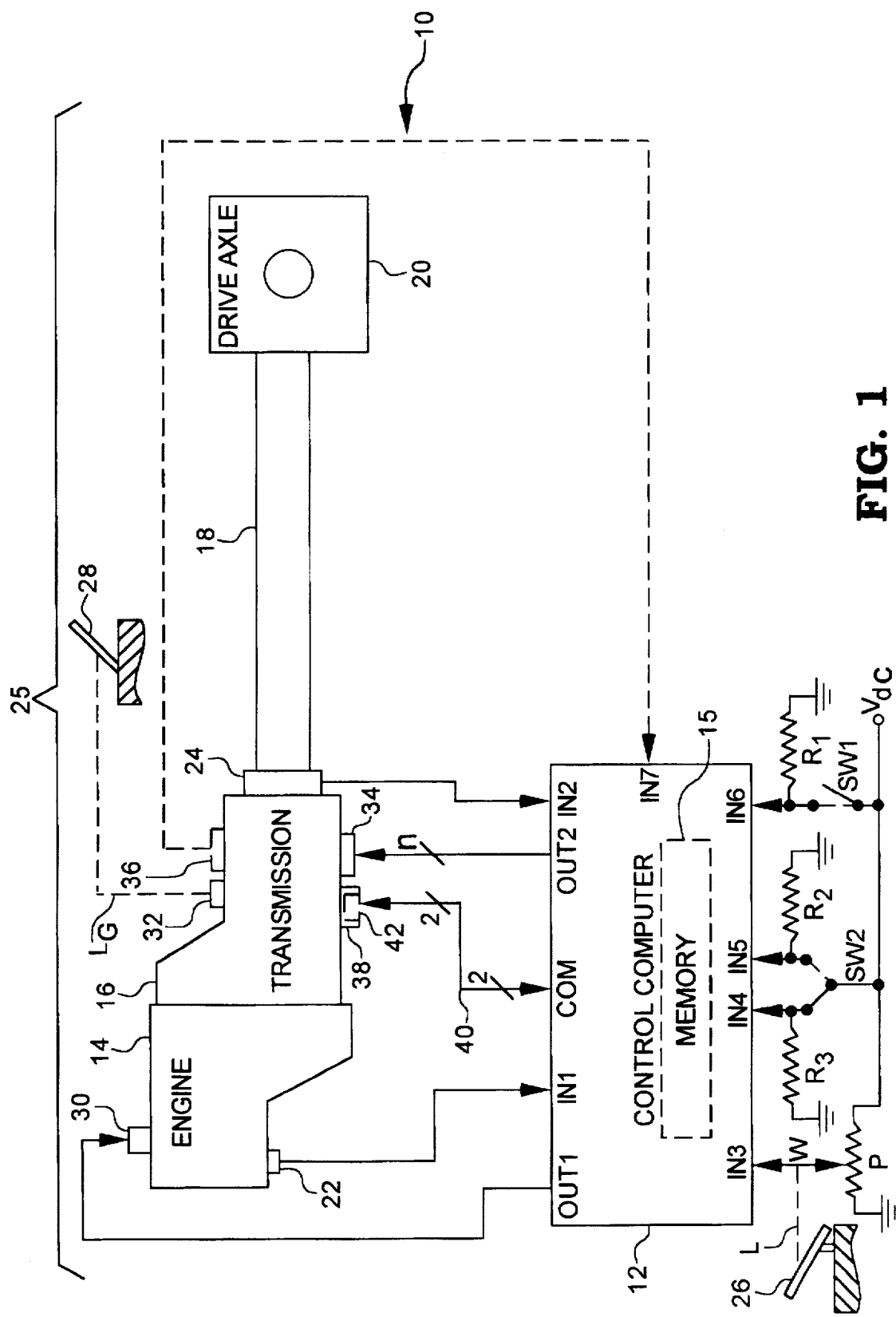
FIG. 1 is a diagrammatic illustration of a engine output torque control system in accordance with one aspect of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, an engine control system 10 for regulating output torque of an internal combustion engine, in accordance with the present invention, is shown. Central to control system 10 is a control computer 12 which interfaces with various components of a motor vehicle drivetrain 25 as will be more fully discussed hereinafter. Control computer 12 is preferably microprocessor-based and includes a memory portion 15, digital I/O, a number of analog-to-digital (A/D) inputs and a communication port (COM) such as a DUART.

The microprocessor portion of control computer 12 runs software routines and manages the overall operation of system 10 and is, in a preferred embodiment, a Motorolla 68336 or equivalent microprocessor. However, the present invention contemplates using any one of a number of known microprocessors capable managing and controlling system 10.

The memory portion 15 of control computer 12 may include ROM, RAM, EPROM, EEPROM, FLASH MEMORY and any other reusable type of memory known to those skilled in the art. Memory portion 15 may be further supplemented by external memory connected thereto (not shown).

The motor vehicle drivetrain 25 includes an internal combustion engine 14 operatively connected to a main transmission 16 as is known in the art. Drivetrain 25 further includes at least a drive axle 20 and a propeller shaft 18 coupling the transmission 16 to the drive axle 20. As is commonly known, particularly in the heavy duty tractor truck art, drivetrain 25 may further include one or more auxiliary transmissions and interconnecting propeller shafts (not shown), power take off (PTO) devices, and other known drivetrain components. Those skilled in the art will recognize that the concepts of the present invention are applicable to any known drivetrain configuration including multiple transmission drivetrains.

A number of sensors and actuators permit control computer 12 to interface with some of the various components of drivetrain 25 as well as other vehicle and engine systems. For example, engine 14 includes an engine speed sensor 22 mounted thereto which is electrically connected to control computer 12 via input IN1. Engine speed sensor 22 is preferably a variable reluctance sensor operable to sense speed and/or position of a toothed gear rotating synchronously with the engine crank shaft. However, the present invention contemplates using any known engine speed sensor 22 operable to sense engine rotational speed and provide a signal to control computer 12 corresponding thereto.

A vehicle speed sensor 24 is preferably operably connected to propeller shaft 18 and electrically connected to control computer 12 via input IN2. Vehicle speed sensor 24 is also preferably a variable reluctance sensor operable to sense rotational speed of propeller shaft 18 and provide a vehicle speed signal to control computer 12 corresponding thereto. While vehicle speed sensor 24 is shown in FIG. 1 as being located adjacent to transmission 16, it is to be understood that sensor 24 may be located anywhere along propeller shaft 18. The present invention further contemplates using any other known vehicle speed sensor, which may be coupled to any one or more of a variety of rotating drivetrain shafts, and operable to provide a vehicle speed signal indicative of vehicle speed.

System 10 further includes an electronically controlled throttle system which is preferably responsive to either a driver actuated throttle or a cruise control system. The driver actuated throttle preferably includes an accelerator pedal 26 which is mechanically coupled via linkage L, to the wiper W of potentiometer P. The wiper W is connected to an analog-to-digital (A/D) converter input IN3 of control computer 12. The position of accelerator pedal 26 corresponds directly to the voltage present on wiper W. One end of potentiometer P is connected to a voltage $V_{dc}$, and the other end is connected to ground potential. The voltage present on wiper W thus ranges between $V_{dc}$ and ground potential. Control computer 12 converts the analog voltage on wiper W to a digital quantity representative of desired throttle percentage. The present invention further contemplates that other known sensors may be alternatively associated with accelerator pedal 26 to provide analog and/or digitals signals corresponding to accelerator pedal position or pressure applied to accelerator pedal 26. In any event, such analog and/or digital signals are processed by control computer 12 to provide a quantity indicative of desired throttle percentage.

The cruise control system preferably includes switches SW1 and SW2 which are mounted in the driver's cab or driver compartment. Switches SW1 and SW2 provide the driver with a means for turning the cruise control functions on and off via switch SW1 and for establishing a cruise speed via switch SW2. Switch SW2 also provides input signals to control computer 12 to activate resume/acceleration features well known in the art of cruise control systems. Switch SW1 thus enables cruise control mode of operation while switch SW2 is used to activate the operational modes of the cruise control system built into the software of control computer 12. Switch SW1 is connected at one end to $V_{dc}$, and at its opposite end to input IN6 of control computer 12 and resistor $R_1$, which is referenced at ground potential. Input IN6 is thus normally at ground potential while switch SW1 is open (cruise control "off"), while input IN6 switches to logic high voltage ($V_{dc}$) when switch SW1 is closed (cruise control "on"). Switch SW2 is a momentary center-off SPDT switch. The center position is connected to $V_{dc}$, a first switch position is connected to control computer input IN4 and resistor $R_3$, which is referenced at ground potential. The remaining position of switch SW2 is connected to control computer input IN5 and resistor $R_2$, which is also referenced at ground potential. The set/coast cruise control function is activated by shorting input IN4 of control computer 12 to logic high voltage, or $V_{dc}$. The resume/acceleration feature of the cruise control system is activated by shorting input IN5 of control computer 12 to logic high voltage $V_{dc}$. These operational features are activated by driver actuation of switch SW2 as is known in the art. While the foregoing description is directed to a preferred cruise control system embodiment, it is to be understood that the present invention contemplates using any cruise control system known to those skilled in the art. In any case, control computer 12 is responsive to the cruise control signals at inputs IN4–IN6 to determine therefrom a desired throttle percentage.

Regardless of the mechanism controlling the throttle, control computer 12 is operable to process the desired throttle percentage and provide a fueling signal therefrom, which fueling signal is provided at output OUT1. Output OUT1 is connected to a fueling system 30 of the engine 14. Fueling system 30 may be any conventional fueling system known to those skilled in the art.

One preferred technique for converting the desired throttle percentage to a fueling signal involves mapping the desired throttle percentage to an appropriate engine fueling rate (EFR) stored in memory unit 15. While many factors other than desired throttle percentage affect the choice of engine fueling rate, the appropriate fueling rate information is converted to a corresponding timing signal provided to engine fueling system 30 via output OUT1. The present invention contemplates, however, that other known techniques may be used to convert the desired throttle percentage to a timing signal suitable for use by engine fueling system 30. Further, those skilled in the art will recognize that control computer 12 typically includes an idle governor algorithm which is operable to maintain a steady engine speed with zero percent throttle input.

Transmission 16 may be any known manual, automatic or manual/automatic transmission. For any manually selectable gear ratios, transmission 16 includes a mechanical input 32 coupled, via mechanical linkage $L_G$, to a gear shift lever 28 typically located in the cab area of the vehicle. As is known in the art, gear shift lever 28 is manually actuatable to select any one of a plurality of manual gear ratios of transmission 16. For any automatically selectable gear ratios, transmission 16 includes one or more actuators 34 which are electrically connected to output OUT2 of control computer 12. As shown in FIG. 1, output OUT2 of control computer 12 is connected to the one or more automatic gear actuators 34 via n signal lines, where n is an integer value indicating one or more signal lines. Typically, the one or more automatic gear actuators 34 are electrically actuated solenoids which are responsive to a control signal provided thereto to control selection of a corresponding automatic gear ratio of transmission 16.

Engine control system 10 may include various mechanisms for providing control computer 12 with information relating to the presently engaged gear ratio of transmission 16. Preferably, memory unit 15 of control computer 12 includes certain information relating to transmission 16, so that control computer 12 is operable to determine the presently engaged gear ratio of transmission 16 at any time the vehicle is moving at a speed sufficient to produce a valid speed signal as a ratio of engine speed (provided at input IN1) to vehicle speed (provided at input IN2). However, the present invention contemplates several alternative techniques for determining the presently engaged gear ratio of transmission 16. For example, transmission 16 may include electrical componentry 36 which is operable to provide a signal to input IN7 of control computer 12, which signal is indicative of the presently engaged gear ratio of transmission 16. In one embodiment, componentry 36 may include a number of microswitches associated with the various transmission gears. The collective status of the various switches may be used to provide a signal indicative of the presently engaged gear ratio. Alternatively, componentry 36 may include transmission input speed and output speed sensors and a processor operable to evaluate the transmission input and output speeds to provide a presently engaged gear ratio signal corresponding thereto. The present invention further contemplates that any known electrical componentry 36 may be used to provide control computer 12 with information relating to the presently engaged gear ratio of transmission 16.

In accordance with the present invention, one technique for determining an appropriate engine fueling rate (EFR) which takes into account the presently engaged gear ratio of transmission 16 involves computing or otherwise determining the appropriate engine fueling rate from presently engaged gear ratio information provided to control computer 12. An alternative technique involves providing such an engine fueling rate (EFR) to control computer 12 via a communications bus 40 connected to a communications input (COM) of control computer 12. Preferably the communications bus or datalink 40 is an SAE (Society of Automotive Engineers) J1939 bus and operates in accordance with the technical specifications set forth in the SAE J1939 standard. According to the SAE J1939 bus industry standard, the control computer 12 is operable to send and receive thereon data regarding the operational parameters of the vehicle.

In accordance with the present invention, transmission 16 may be equipped with circuitry 38 operable to detect the presently engaged gear ratio of transmission 16, as well as a microprocessor 42. Microprocessor 42 preferably includes a communications port connected to communications bus 40 so that all information available on communications bus 40 is available not only to control computer 12 but to microprocessor 42 as well.

Microprocessor 42 may use any information available on communication bus 40, or may use the electrical components within electrical circuitry 38, to detect the presently engaged gear of transmission 16 in accordance with any of the previously discussed techniques. In one embodiment, microprocessor 42 may then transmit such gear ratio information over communication bus 40 to control computer 12 for further processing, as previously discussed, to provide corresponding engine fueling information. Alternatively, microprocessor 42 may include memory having a plurality of engine fueling rates stored therein. In this embodiment, microprocessor 42 may therefore not only determine the presently engaged gear ratio of transmission 16, but may further match an engine fueling rate, or torque command, stored within microprocessor 42 with the presently engaged gear ratio information, and thereafter transmit the engine fueling rate, or torque command, information to control computer 12 via communications bus 40. Control computer 12 may then directly convert the engine fueling rate, or torque command, information provided thereto by microprocessor 42 into a fueling signal suitable for use by fueling system 30 of engine 14.

Figure 2A:
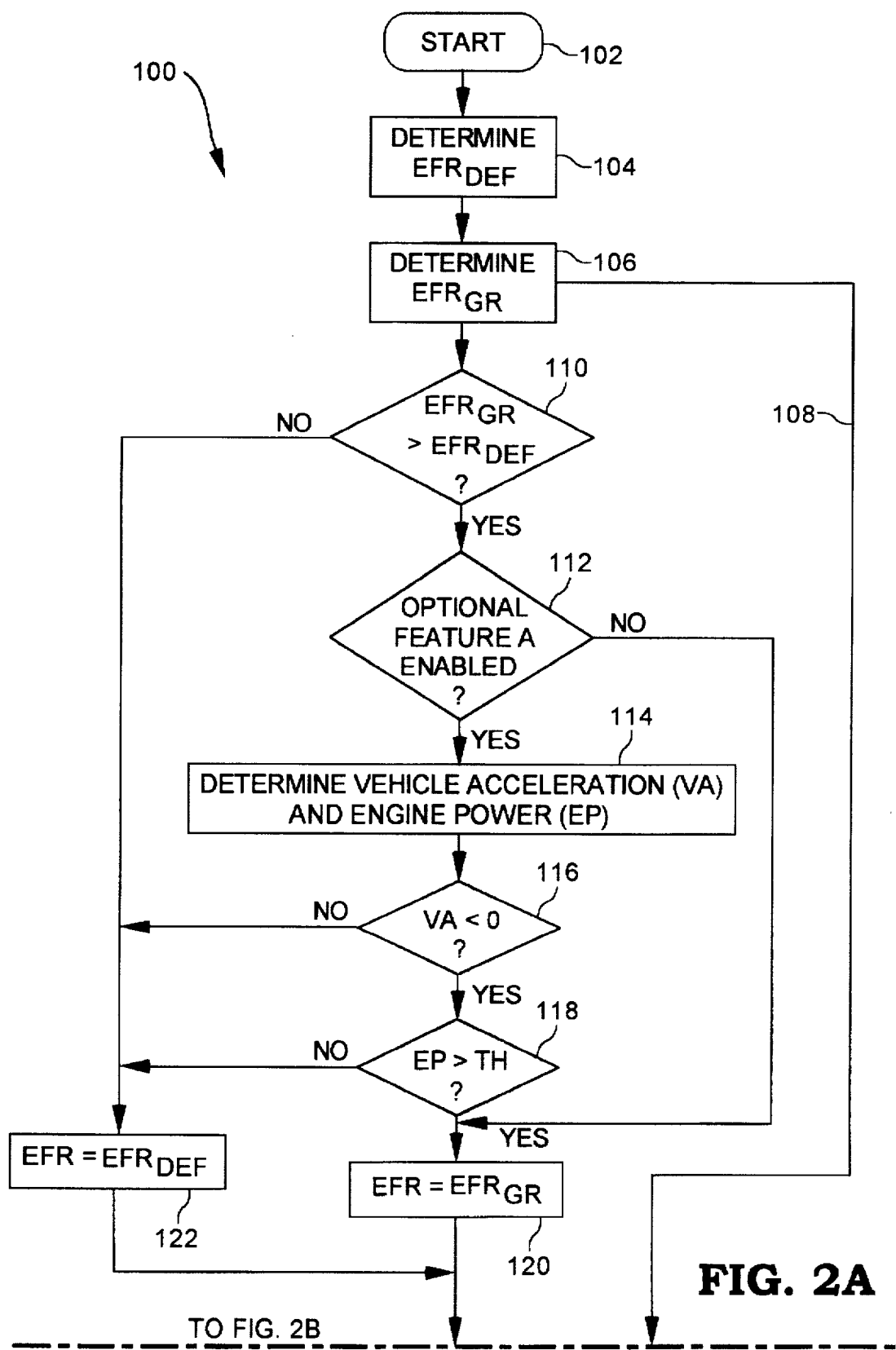
FIG. 2 is composed of FIGS. 2A and 2B, and is a flowchart illustrating a software algorithm for regulating engine output torque as a function of drivetrain input torque capacity, in accordance with another aspect of the present invention.
Figure 2B:
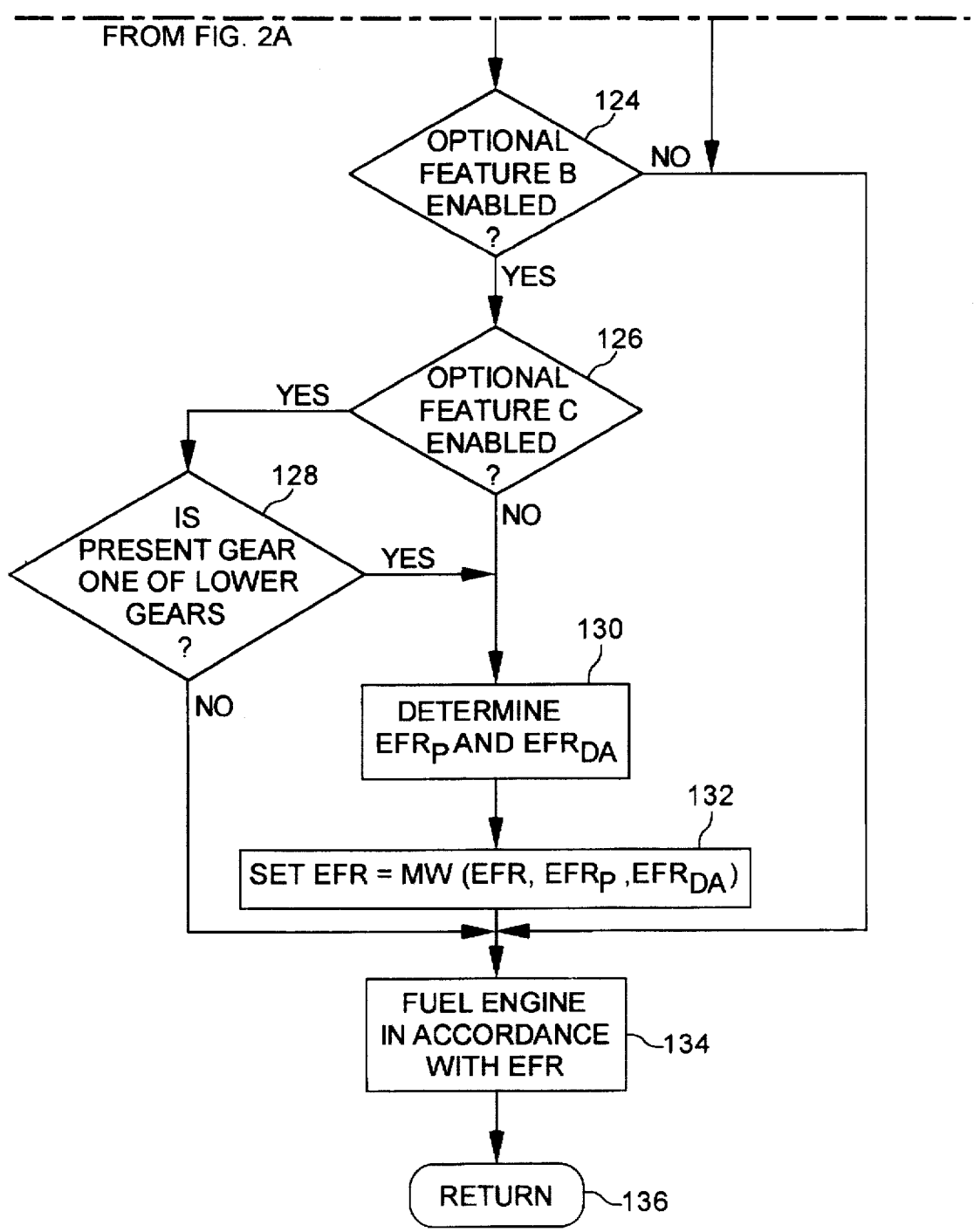
Figure 3:
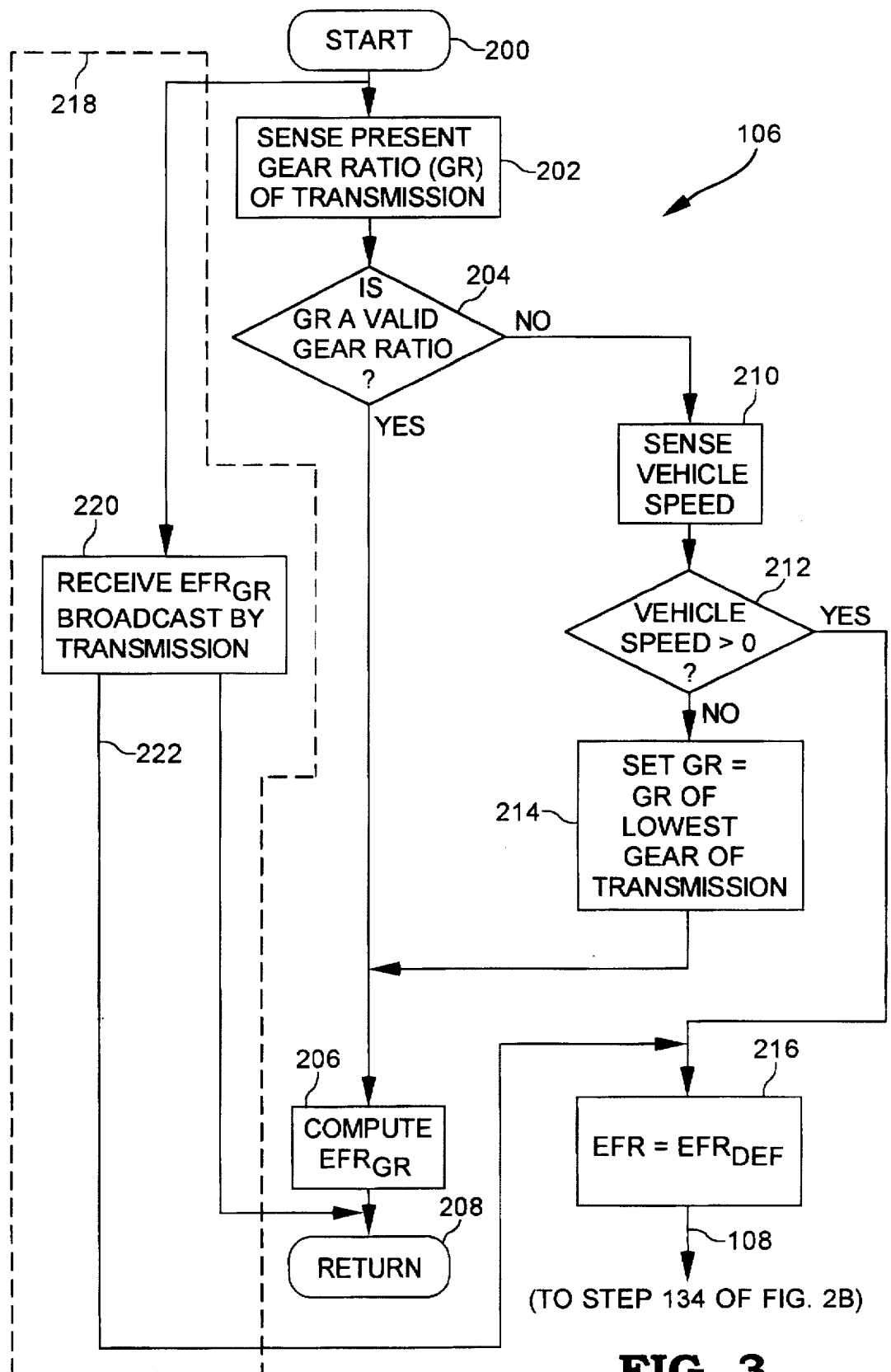
FIG. 3 is a flowchart illustrating alternative techniques for determining an engine fueling rate at which the resulting engine torque is limited by a maximum input torque capacity of a presently engaged gear ratio of the transmission, in accordance with yet another aspect of the present invention.

Referring now to FIG. 2, which is composed of FIGS. 2A and 2B, and FIG. 3, one preferred embodiment of a software algorithm for determining appropriate engine fueling rate information, in accordance with the present invention, is shown in flowchart form. The algorithm of FIGS. 2 and 3 is preferably executable by control computer 12 several times per second. Referring to FIG. 2A specifically, the algorithm 100 starts at step 102, and at step 104, control computer 12 determines a default engine fueling rate $EFR_{DEF}$, wherein $EFR_{DEF}$ is a function of various vehicle and engine operating conditions including, for example, engine speed, engine load, desired throttle percentage and cruise control status, wherein the resulting engine output torque is limited by the nominal input torque capacity of transmission 16 as described in the BACKGROUND section and as is known in the art. The nominal input torque capacity of transmission 16, as defined in the BACKGROUND section, is a known quantity associated with transmission 16, and is a quantity that is preferably stored within memory 15 of control computer 12.

Algorithm execution continues from step 104 at step 106 where control computer 12 determines a gear ratio-based maximum engine fueling rate $EFR_{GR}$, which is a function of various vehicle and engine operating conditions, as discussed above, wherein the resulting engine output torque is limited by the maximum input torque capacity of the presently engaged gear ratio of transmission 16 rather than by the nominal input torque capacity of transmission 16. The present invention contemplates several alternative techniques for accomplishing step 106, which techniques are discussed hereinafter with respect to FIG. 3. As will be discussed with reference to FIG. 3, step 106 includes a flow path 108 which, under certain circumstances, directs algorithm 100 to step 134 (FIG. 2B).

From step 106, algorithm execution continues at step 110 where $EFR_{GR}$ is compared with $EFR_{DEF}$. If, at step 110, $EFR_{GR}$ is greater than $EFR_{DEF}$, and assuming for the moment that optional feature A is not enabled at step 112, algorithm execution continues at step 120 where control computer 12 sets the actual engine fueling rate EFR equal to $EFR_{GR}$, after which algorithm execution continues at step 124. Alternatively, if $EFR_{GR}$ is not greater than $EFR_{DEF}$ at step 110, EFR is set equal to the default engine fueling rate $EFR_{DEF}$ at step 122, and algorithm execution continues therefrom at step 124.

Referring now to FIG. 2B, the algorithm checks, at step 124, whether an optional feature B has been enabled. Assuming for the moment that optional feature B has not been enabled, algorithm execution continues at step 134 where the engine 14 is fueled, as previously discussed, in accordance with the engine fueling rate EFR, after which the algorithm continues at step 136 where software program control is returned to its calling routine.

From the foregoing, it should now be apparent that without any of the optional algorithm features enabled, control computer 12 is operable, under the direction of algorithm 100, to determine a default engine fueling rate, which is limited by the nominal input torque capacity of the transmission 16, a gear ratio-based maximum engine fueling rate, which is limited by the maximum input torque capacity of the presently engaged gear ratio of the transmission 16, and fuel the engine 14 in accordance with the greater of the two engine fueling rate quantities.

Referring back to FIG. 2A, algorithm 100 includes an optional feature A. Preferably, feature A is a software feature that may be enabled, or programmed for operation, by an end user of the vehicle such as a fleet owner or vehicle distributor. The present invention contemplates that feature A may be so enabled or disabled with a diagnostic or calibration tool as is known in the art. If, at step 110, $EFR_{GR}$ is greater than $EFR_{DEF}$, algorithm execution continues at step 112 where control computer 12 tests whether optional feature A is enabled. If feature A is not enabled, algorithm execution continues at step 120. If, however, optional feature A is enabled at step 112, algorithm execution continues at step 114 where vehicle acceleration (VA) and engine operating power (EP) are determined. Preferably, control computer 12 determines vehicle acceleration by monitoring vehicle speed over time and computing acceleration in accordance with well known equations, and computes engine operating power in accordance with well known equations. Engine operating power may be determined via engine load, in accordance with well known equations based on operating parameters including engine speed and vehicle speed, via throttle percentage (or position), wherein the throttle may be controlled manually or via cruise control as described hereinabove, or via a combination of both engine load and throttle percentage. However, the present invention contemplates that vehicle acceleration and engine operating power may be computed in accordance with any of a variety of known techniques, and based on other known vehicle operating parameters.

Algorithm execution continues from step 114 at step 116 where vehicle acceleration is tested against a predefined acceleration level. Preferably, the predefined vehicle acceleration level is set at zero acceleration so that program execution continues at step 118 only if the vehicle is experiencing negative acceleration (deceleration). On the other hand, if the vehicle acceleration is constant or is increasing, algorithm execution continues from step 116 at step 122. It is to be understood that while the predefined acceleration level is preferably set at zero acceleration, any other predetermined acceleration level, positive or negative, may be used as the predefined acceleration level in step 116.

If vehicle acceleration is less than the predefined acceleration level at step 116, algorithm execution continues at step 118 where control computer 12 compares engine operating power against a predefined engine power threshold TH. If engine operating power is greater than the predefined engine power threshold TH at step 118, program execution continues at step 120. If, at step 118, engine operating power is less than or equal to the predefined engine power threshold TH, algorithm execution continues at step 122. While the present invention contemplates that the engine power threshold TH may be set at any engine power level, a preferred value of TH is somewhere between 90 and 100 percent.

From the foregoing description of optional feature A, it should now be apparent that this feature permits control computer 12 to enable the greater of the engine fueling rates $EFR_{DEF}$ and $EFR_{GR}$ for subsequent engine fueling in accordance with the basic algorithm described hereinabove only after the vehicle experiences a negative acceleration under heavy engine load operation. Such a feature enables default engine fueling under normal operating conditions, while providing for higher levels of engine output torque under conditions demanding increased power output such as, for example, when experiencing a steep uphill grade.

Referring again to FIG. 2B, algorithm 100 includes another optional feature B. As with feature A, feature B is preferably programmable for enablement or disablement via a diagnostic or calibration tool. At step 124, control computer 12 tests whether optional feature B is enabled. If not enabled, algorithm execution continues at step 134. If, however, optional feature B is enabled at step 124, algorithm execution continues at step 126 where control computer 12 tests whether optional feature C is enabled. Assuming for the moment that optional feature C is not enabled, program execution continues at step 130 where two additional engine fueling rate values are determined by control computer 12. The first, $EFR_P$, is a function of various vehicle and engine operating conditions, as previously discussed, wherein the resulting engine output torque is limited by the maximum operating torque capacity of the propeller shaft 18 (FIG. 1) rather than by any input torque capacity associated with transmission 16 or other drivetrain component. The second, $EFR_{DA}$, is a function of various vehicle and engine operating conditions, as previously discussed, wherein the resulting engine output torque is limited by the maximum operating torque capacity of the drive axle 20 (FIG. 1) rather than by any input torque capacity associated with transmission 16 or other drivetrain component. Preferably, memory unit 15 of control computer 12 includes data relating to the maximum operating torque capacities of propeller shaft 18 and drive axle 20 respectively. Control computer 12 is thereafter operable, as previously discussed, to determine engine fueling rates based thereon which result in engine output torque levels that are limited by the maximum operating torque capacities of these components. Alternatively, microprocessor 42 may contain such operating torque capacity limits, which information is passed to control computer 12 via communication bus 40. As another alternative, microprocessor 42 may contain or compute engine fueling rates $EFR_P$ and $EFR_{DA}$, which information is passed to control computer 12 via communication bus 40.

Algorithm execution continues from step 130 at step 132 where the actual engine fueling rate EFR is set equal to the minimum of the previous value of EFR (corresponding to the larger of $EFR_{DEF}$ and $EFR_{GR}$), $EFR_P$ and $EFR_{DA}$. Algorithm execution continues from step 132 at step 134 where the engine 14 is fueled in accordance with the value of EFR.

From the foregoing description of optional feature B, it should now be apparent that this feature permits control computer 12 to determine a maximum safe engine fueling rate based on the maximum operating torque capacities of the various drivetrain components. Such a feature recognizes that engine output torque will, under certain circumstances, be limited not by the presently engaged transmission gear, but by a lesser maximum operating torque capacity of a downstream drivetrain component. Such a condition may occur particularly in lower gear ratios of transmission 16.

As a numerical example of feature B, assume that a lower gear ratio of transmission 16 is a 10:1 gear ratio and has a maximum input torque capacity of 1,450 ft. lbs., the drive axle 20 has a maximum operating torque capacity of 15,000 ft. lbs. and the propeller shaft 18 has a maximum operating torque capacity of 10,000 ft. lbs. Without optional feature B enabled, and based on the presently engaged gear ratio of transmission 16, the engine fueling rate (EFR) for maximum vehicle performance would be set by algorithm 100 so that it results in a maximum engine output torque level of 1,450 ft. lbs. However, with a 10:1 gear ratio, the propeller shaft 18 and drive axle 20 would each be subject to 14,500 ft. lbs. of torque. While the drive axle 20 has a maximum operating torque capacity of 15,000 ft. lbs. and could therefore accommodate an engine output torque level of 1,450 ft. lbs., the propeller shaft 18 has a maximum operating torque capacity of only 10,000 ft. lbs. An engine output torque level of 1,450 ft. lbs. would therefore subject propeller shaft 18 to 4,500 ft. lbs. above its maximum operating torque capacity, which would likely lead to damage to, or destruction of, propeller shaft 18. With optional feature B enabled, control computer 12 takes into account the maximum operating torque capacity of propeller shaft 18, and correspondingly limits the engine fueling rate (EFR) to produce an engine output torque level of 1,000 ft. lbs., which is a safe operating torque level for all drivetrain components.

The present invention contemplates that the maximum operating torque capacities for any and all drivetrain components downstream of transmission 16 may be programmable in memory 15 by an end user of the vehicle using a diagnostic or calibration tool. Further, while algorithm 100 provides for determining an engine fueling rate (EFR) limited by maximum torque capacities of individual gear ratios of transmission 16, propeller shaft 18 and drive axle 20, it is to be understood that EFR may be further limited by maximum torque capacities of other drivetrain components as well, including, for example, universal joints, a PTO device, one or more auxiliary transmissions, any additional interconnecting propeller shafts, and the like.

Referring once more to FIG. 2B, algorithm 100 includes yet another optional feature C. As with features A and B, feature C is preferably programmable for enablement or disablement via a diagnostic or calibration tool. At step 126, control computer 12 tests whether optional feature C is enabled. If not enabled, algorithm execution continues with optional feature B at step 130. If, however, optional feature C is enabled at step 126, algorithm execution continues at step 128 where the status of the presently engaged gear ratio of transmission 16 is tested. If, at step 128, the presently engaged gear ratio is one of a set of lower gears of transmission 16 having correspondingly high numeric gear ratios, algorithm execution continues with optional feature B at step 130. If, however, the presently engaged gear ratio is not one of the lower gears of transmission 16 (and is therefore a numerically lower gear ratio thereof), the algorithm 100 skips steps 130 and 132 and proceeds directly from step 128 to step 134. In one embodiment of the present invention, lower gears of transmission 16 having gear ratios of 10:1 or higher result in step 128 proceeding to step 130, although the present invention contemplates proceeding from step 128 to step 130 for any gear ratios higher than 1:1.

From the foregoing description of optional feature C, it should now be apparent that this feature permits execution of optional feature B only if the present gear ratio is one of the lower gear ratios of transmission 16. Feature C thus permits control computer 12 to determine engine fueling rate (EFR) limited by the maximum torque capacities of all drive train components only if transmission 16 is presently engaged in a lower gear thereof. Feature C recognizes that the maximum torque capacities of drivetrain components downstream of transmission 16 are likely to cause concern predominately in the lower gears (corresponding to numerically higher gear ratios) thereof as previously discussed. According to feature C, in upper gear ratios of transmission 16 where the maximum torque capacities of drivetrain components downstream of transmission 16 are not likely to cause concern, the engine fueling rate is determined to be the larger of the engine fueling rates $EFR_{DEF}$ and $EFR_{GR}$.

From the flowchart of FIGS. 2A and 2B, it should now be apparent that engine output torque regulation is controlled through a gear ratio based engine torque control algorithm which fundamentally regulates engine output torque as a function of a presently engaged gear ratio of transmission 16. It is intended that the engine output torque produced in any given gear ratio of the transmission 16 should be transparent to the driver whether operating the throttle via accelerator 26 or via cruise control operation. Additionally, several optional features are included with algorithm 100. For example, under conditions where the engine output torque will exceed the nominal input torque capacity of a given transmission, control computer 12 is capable of limiting the engine output torque in accordance with the greater of the maximum input torque capacity of the presently engaged transmission gear ratio and the nominal input torque capacity of the transmission either (a) at all times, regardless of operating conditions; or (b) only after the vehicle experiences a negative acceleration under heavy engine load operation. Additionally, control computer 12 is capable of limiting the engine output torque level in accordance with the smallest maximum input torque capacity of all drivetrain components downstream of transmission 16 either, (a) at all times, regardless of the presently engaged transmission gear ratio; or (b) only when operating in one of the lower gears of a given transmission 16. It is to be understood that optional feature A may be enabled/disabled independently of optional feature B and C, and that feature B may be enabled/disabled independently of features A and C, but that enablement of feature C requires enablement of feature B.

Referring now to FIG. 3, a flowchart is shown illustrating a number of alternative algorithms for accomplishing step 106 of FIG. 2A, wherein control computer 12 determines an engine fueling rate $EFR_{GR}$ at which the resulting engine torque is limited by the maximum input torque capacity of the presently engaged gear ratio of transmission 16. In accordance with a first embodiment of algorithm 106 of FIG. 3, the algorithm starts at step 200 and at step 202, control computer 12 senses the presently engaged gear ratio (GR) of transmission 16. Step 202 may be accomplished using any of the techniques described with respect to FIG. 1. From step 202, algorithm execution continues at step 204 where control computer 12 determines whether GR is a valid gear ratio of transmission 16. If, at step 204, control computer 12 determines that the presently engaged gear ratio is a valid gear ratio, algorithm execution continues at step 206 where the control computer 12 determines engine fueling rate $EFR_{GR}$, as previously described, wherein $EFR_{GR}$ is limited by the input torque capacity of the gear ratio GR of transmission 16. Preferably, memory unit 15 of control computer 12 contains a generated calibration which has multiple engine fueling rates $EFR_{GR}$ associated therewith, which correspond to the maximum input torque capacities of selected gear ratios within any given transmission 16. Control computer 12 is then operable in step 206 to retrieve $EFR_{GR}$ from memory unit 15. Alternatively, specific transmission gear ratios and corresponding maximum input torque limits may be stored within memory unit 15, and control computer 12 is operable at step 206 to compute $EFR_{GR}$ from a parent engine fueling rate to satisfy the maximum torque input limits for specific gear ratios of transmission 16. In either case, algorithm execution continues from step 206 at 208 where algorithm execution returns to step 106 of FIG. 2A.

If, at step 204, control computer 12 determines that the presently engaged gear ratio GR is an invalid gear ratio of transmission 16, algorithm execution continues at step 210 where control computer 12 evaluates the vehicle speed signal present at input IN2, after which control computer 12 tests the vehicle speed signal against a predefined speed value at step 212. If, at step 212, the vehicle speed is greater than the predefined speed value, then algorithm execution continues at step 216 where the actual engine fueling rate EFR is set equal to the default engine fueling rate $EFR_{DEF}$, and algorithm execution continues along flow path 108 to step 134 of the flowchart of FIG. 2B. If, however, control computer 12 determines, at step 212, that the vehicle speed is less than or equal to the predefined speed value, algorithm execution continues at step 214 where GR is set to the lowest gear ratio of the transmission 16, after which algorithm execution continues at step 206. Preferably, the predefined speed value is set at 0 MPH, although the present invention contemplates that any vehicle speed value may be used as the predefined speed value in step 212.

From the foregoing description, it should now be apparent that step 106 of algorithm 100 is accomplished, in accordance with one embodiment of the present invention, by sensing the presently engaged gear ratio of the transmission 16, and if this gear ratio is a valid gear ratio, control computer 12 is operable to compute $EFR_{GR}$ according to either of the previously described techniques. An invalid gear ratio at step 204 can mean one of two possibilities. First, if the vehicle speed is greater than a predefined vehicle speed, a fault may exist somewhere, a shift may be occurring, or some other vehicle operational event may be in progress, in which case the algorithm will default to provide the default engine fueling rate $EFR_{DEF}$. If, however, the vehicle speed is less than or equal to the predetermined vehicle speed, then the algorithm assumes that the transmission 16 is presently engaged in the lowest gear ratio thereof. This portion of the algorithm is intended to address the situation where the vehicle is stationary, in which case the preferred technique of determining the presently engaged gear ratio as a ratio of engine speed to vehicle speed inevitably produces an invalid gear ratio signal (vehicle speed=0). As such, a preferred value for the predefined vehicle speed is set at 0 MPH. This feature provides for regulated engine output torque capability during vehicle takeoff.

As an alternative to the foregoing embodiment of algorithm 106 of FIG. 3, steps 202–206 and 210–214 may be replaced by step 220 as indicated by the dashed-line box 218. In this case, algorithm execution begins at step 200 and continues at step 220 where control computer 12 receives the engine fueling rate $EFR_{GR}$ which is broadcast by microprocessor 42 of transmission 16, and which is preferably received by control computer 12 over the communications bus 40. Preferably, step 220 includes provisions for determining an invalid gear ratio due to a fault condition, which is acted upon by directing algorithm execution to step 216 via flow path 222. Further, step 220 preferably includes provisions for determining $EFR_{GR}$ as an engine fueling rate at which the resulting engine output torque is limited by the maximum input torque capacity of the lowest gear ratio of transmission 16 when vehicle speed is less than or equal to the predefined speed value.

In view of the foregoing description of the preferred embodiments of the present invention, it should now be apparent that by regulating the engine output torque as a function of the maximum torque capacity of the presently engaged gear ratio of the transmission 16, which may be further regulated as a function of the maximum operating torque capacities of drivetrain components downstream of transmission 16, engine output torque is no longer limited to a fixed level by the nominal input torque capacity of a given transmission. More specifically, in gear ratios of transmission 16 which ultimately have torque capacities which exceed the nominal input torque limit of transmission 16, a gear ratio based engine torque control algorithm enables higher levels of drivetrain input torque, and therefore maximizes the performance potential of a given capacity drivetrain configuration. The present invention thus enables higher peak levels of performance to be reached without introducing alternative, higher capacity, powertrain components.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of regulating torque applied to an automotive drive train by an internal combustion engine, the engine producing the torque in accordance with a fueling rate provided to a fueling system thereof, the drive train including a transmission coupled to the engine and having a plurality of engageable gear ratios, a drive axle and a propeller shaft coupling the transmission to the drive axle, the method comprising the steps of:

determining a first engine fueling rate at which the resulting engine torque is limited by a maximum input torque capacity of a presently engaged gear ratio of the transmission;

determining a second engine fueling rate at which the resulting engine torque is limited by a maximum operating torque capacity of the propeller shaft;

defining an actual engine fueling rate as a minimum of said first and second engine fueling rates; and fueling the engine in accordance with said actual engine fueling rate.

2. The method of claim 1 further including the step of determining a third engine fueling rate at which the resulting engine torque is limited by a maximum operating torque capacity of the drive axle;

and wherein said defining step includes defining said actual engine fueling rate as a minimum of said first, second and third engine fueling rates.

3. The method of claim 2 further including the step of performing the determining said second and third engine fueling rates steps and the defining an actual engine fueling rate step only if said presently engaged gear ratio corresponds to a lower gear ratio of the transmission, and otherwise defining said actual engine fueling rate as said first engine fueling rate.

4. The method of claim 1 further including the step of performing the determining said second engine fueling rate step and the defining an actual engine fueling rate step only if said presently engaged gear ratio corresponds to a lower gear ratio of the transmission, and otherwise defining said actual engine fueling rate as said first engine fueling rate.

5. The method of claim 1 wherein the determining a first engine fueling rate step includes the steps of:

sensing said presently engaged gear ratio of the transmission; and determining said first engine fueling rate in accordance with said presently engaged gear ratio only if said presently engaged gear ratio indicates a valid gear ratio of the transmission.

6. The method of claim 5 wherein the determining a first engine fueling rate step further includes the steps of:

sensing vehicle speed; and determining said first engine fueling rate as a fueling rate at which the resulting engine torque is limited by a maximum input torque capacity of a lowest of the engageable transmission gear ratios if said presently engaged gear ratio indicates an invalid gear ratio of the transmission and said vehicle speed is below a predefined vehicle speed.

7. The method of claim 6 wherein the determining a first engine fueling rate step further includes the step of determining said first engine fueling rate as a fueling rate at which the resulting engine torque is limited by a predefined input torque capacity of the transmission if said presently engaged gear ratio indicates an invalid gear ratio of the transmission and said vehicle speed is above said predefined vehicle speed.

8. A control system for regulating torque applied to an automotive drive train of a vehicle by an internal combustion engine, the drive train including a transmission coupled to the engine and having a plurality of engageable gear ratios, a drive axle and a propeller shaft coupling the transmission to the drive axle, the system comprising:

a fueling system associated with the engine and responsive to a fueling rate signal to provide engine output torque in accordance therewith;

means for determining a presently engaged gear ratio of the transmission and providing a gear ratio signal corresponding thereto; and a processor responsive to said gear ratio signal to determine a first engine fueling rate signal corresponding to a fueling rate at which the resulting engine output torque is limited by a maximum input torque capacity of said presently engaged gear ratio, said processor further determining a second engine fueling rate signal corresponding to a fueling rate at which the resulting engine output torque is limited by a maximum input torque capacity of the propeller shaft, said processor providing said fueling rate signal to said fueling system as the smaller of said first and second engine fueling rate signals.

9. The control system of claim 8 wherein said processor is operable to determine a third engine fueling rate signal corresponding to a fueling rate at which the resulting engine torque is limited by a maximum operating torque capacity of the drive axle;

and wherein said processor is further operable to to provide said fueling rate signal to said fueling system as the smaller of said first, second and third engine fueling rate signals.

10. The control system of clam 9 wherein said processor is operable to determine said second and third engine fueling rates and provide said fueling rate signal to said fueling system as the smaller of said first, second and third engine fueling rate signals only if said presently engaged gear ratio corresponds to a lower gear ratio of the transmission, and otherwise defining said providing said fueling rate signal to said fueling system as said first engine fueling rate signal.

11. The control system of claim 9 further including a memory unit having a plurality of fueling rate signals stored therein, said processor determining said first fueling rate signal by retrieving an appropriate one of said plurality of fueling rate signals in accordance with said presently engaged gear ratio signal.

12. The control system of claim 11 wherein said maximum input torque capacity of the propeller and said maximum input torque capacity of the drive axle are stored within said memory unit;

and wherein said processor determines said second and third fueling rate signals by retrieving appropriate ones of said plurality of fueling rate signals in accordance with said said maximum input torque capacities of the propeller and drive axle respectively.

13. The control system of claim 12 wherein said maximum input torque capacity of the propeller and said maximum input torque capacity of the drive axle are user programmable data values.

14. The control system of claim 8 further including a data communications link connected to said processor, said first engine fueling rate signal provided to said processor from a remote processor via said data communications link.

15. A method of regulating torque applied to an automotive drive train of a vehicle by an internal combustion engine, the engine producing the torque in accordance with a fueling rate provided to a fueling system thereof, the drive train including a transmission coupled to the engine and having a plurality of engageable gear ratios, the method comprising the steps of:

determining a presently engaged gear ratio of the transmission;

setting said presently engaged gear ratio to a lowest one of the gear ratios of the transmission if the vehicle is stationary;

determining a regulated engine fueling rate at which the resulting engine torque is limited by a maximum input torque capacity of said presently engaged gear ratio of the transmission; and fueling the engine in accordance with said regulated engine fueling rate.

16. The method of claim 15 further including the steps of:

determining a default engine fueling rate at which the resulting engine torque is limited by a nominal input torque capacity of the transmission; and comparing said regulated engine fueling rate to said default engine fueling rate;

and wherein the fueling step is conditioned upon said regulated engine fueling rate exceeding said default engine fueling rate, and otherwise fueling the engine in accordance with said default engine fueling rate.

17. A control system for regulating torque applied to an automotive drive train of a vehicle by an internal combustion engine, the drive train including a transmission coupled to the engine and having a plurality of engageable gear ratios, the system comprising:

a fueling system associated with the engine and responsive to a fueling rate signal to provide engine output torque in accordance therewith;

means for determining a presently engaged gear ratio of the transmission and providing a gear ratio signal corresponding thereto;

a vehicle speed sensor for sensing vehicle speed and producing a vehicle speed signal corresponding thereto; and a processor receiving said gear ratio signal and determining validity thereof, said processor responsive to a valid gear ratio signal to determine a first engine fueling rate signal corresponding to a fueling rate at which the resulting engine output torque is limited by a maximum input torque capacity of said presently engaged gear ratio, said processor responsive to an invalid gear ratio signal and to said vehicle speed signal to determine a second engine fueling rate signal corresponding to a fueling rate at which the resulting engine output torque is limited by a maximum input torque capacity of a lowest of the engageable gear ratios of the transmission if said vehicle speed signal is below a predefined vehicle speed signal level, said processor providing said fueling rate signal as one of said first and second engine fueling rate signals.

18. The control system of claim 17 wherein said processor is further responsive to said invalid gear ratio signal and to said vehicle speed signal to determine a third engine fueling rate signal corresponding to a fueling rate at which the resulting engine output torque is limited by a nominal input torque capacity of the transmission if the vehicle speed signal is above said predefined vehicle speed signal level;

and wherein said processor further provides said fueling rate signal as one of said first, second and third engine fueling rate signals.

19. A method of regulating torque applied to an automotive drive train of a vehicle by an internal combustion engine, the engine producing the torque in accordance with a fueling rate provided to a fueling system thereof, the drive train including a transmission coupled to the engine and having a plurality of engageable gear ratios, the method comprising the steps of:

determining a default engine fueling rate at which the resulting engine torque is limited by a nominal input torque capacity of the transmission;

determining a presently engaged gear ratio of the transmission;

determining a regulated engine fueling rate at which the resulting engine torque is limited by a maximum input torque capacity of said presently engaged gear ratio of the transmission;

determining an acceleration value corresponding to an acceleration rate of the vehicle;

determining an engine power value corresponding to engine operating power;

defining an actual engine fueling rate as said regulated engine fueling rate if said acceleration value is less than a predefined acceleration rate and said engine power value is greater than a threshold value, and otherwise defining said actual engine fueling rate as said default engine fueling rate; and fueling the engine in accordance with said actual engine fueling rate.

20. A control system for regulating torque applied to an automotive drive train of a vehicle by an internal combustion engine, the drive train including a transmission coupled to the engine and having a plurality of engageable gear ratios, the system comprising:

a fueling system associated with the engine and responsive to a fueling rate signal to provide engine output torque in accordance therewith;

means for determining a presently engaged gear ratio of the transmission and providing a gear ratio signal corresponding thereto;

an engine speed sensor for sensing engine speed and producing an engine speed signal corresponding thereto;

a vehicle speed sensor for sensing vehicle speed and producing a vehicle speed signal corresponding thereto; and a processor responsive to said gear ratio signal to determine a first engine fueling rate signal corresponding to a fueling rate at which the resulting engine output torque is limited by a maximum input torque capacity of said presently engaged gear ratio, said processor further determining a second engine fueling rate signal corresponding to a fueling rate at which the resulting engine output torque is limited by a nominal input torque capacity of the transmission, said processor responsive to said vehicle speed signal to determine vehicle acceleration rate, and further to said engine speed signal to determine engine operating power, said processor providing said fueling rate signal as said first engine fueling rate signal if said vehicle acceleration is less than a predefined acceleration rate and said engine operating power is greater than a threshold value, and otherwise as said second engine fueling rate signal.

21. The control system of claim 20 further including a memory unit having said predefined acceleration rate stored therein.

22. The control system of claim 21 wherein said predefined acceleration rate stored within said memory unit is a user programmable data value.

23. A control system for regulating torque applied to an automotive drive train of a vehicle by an internal combustion engine, the drive train including a transmission coupled to the engine and having a plurality of engageable gear ratios, the system comprising:

a fueling system associated with the engine and responsive to a fueling rate signal to provide engine output torque in accordance therewith;

a first processor associated with the transmission, said first processor determining a presently engaged gear ratio of the transmission and producing a regulated engine fueling rate signal corresponding to a fueling rate at which the resulting engine output torque is limited by a maximum input torque capacity of said presently engaged gear ratio;

a second processor associated with the engine, said second processor determining a default fueling rate signal corresponding to a fueling rate at which the resulting engine output torque is limited by a nominal input torque capacity of the transmission, said second processor receiving said regulated fueling rate signal from said first processor and providing said fueling rate signal to said fueling system as the larger of said regulated fueling rate signal and said default fueling rate signal.

24. The control system of claim 23 further including a data communications line connected to said first and second processors, said first processor providing said regulated fueling rate signal to said second processor via said communications link.

* * * * *